United States Patent
Laden et al.

(10) Patent No.: US 10,291,788 B2
(45) Date of Patent: May 14, 2019

(54) SEGMENTING DATA USAGE OF A DEVICE TO ASSOCIATE THE DATA USAGE WITH AN ACCOUNT

(71) Applicant: Verizon Patent and Licensing Inc., Arlington, VA (US)

(72) Inventors: Matthew M. Laden, Masaryktown, FL (US); John C. Powell, Marysville, OH (US); Edward DeMaria, Highland Mills, NY (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 147 days.

(21) Appl. No.: 15/258,505

(22) Filed: Sep. 7, 2016

(65) Prior Publication Data

US 2018/0069966 A1   Mar. 8, 2018

(51) Int. Cl.
*H04M 15/00* (2006.01)
*H04W 8/26* (2009.01)
*H04W 4/24* (2018.01)
*H04W 8/18* (2009.01)

(52) U.S. Cl.
CPC ....... *H04M 15/7652* (2013.01); *H04M 15/58* (2013.01); *H04M 15/61* (2013.01); *H04M 15/8214* (2013.01); *H04M 15/83* (2013.01); *H04W 4/24* (2013.01); *H04W 8/26* (2013.01); *H04M 15/00* (2013.01); *H04M 15/41* (2013.01); *H04M 15/43* (2013.01); *H04M 15/80* (2013.01); *H04W 8/18* (2013.01)

(58) Field of Classification Search
CPC ....... H04W 4/24; H04M 15/00; H04M 15/80; H04M 15/58; H04M 15/43; H04M 15/41

USPC ................................................. 455/405–408
See application file for complete search history.

(56) References Cited

U.S. PATENT DOCUMENTS

| | | | | |
|---|---|---|---|---|
| 8,644,469 | B2* | 2/2014 | Aaron | H04M 15/73 379/114.17 |
| 8,831,560 | B2* | 9/2014 | Cai | G06Q 30/0283 455/406 |
| 2014/0066008 | A1* | 3/2014 | Ingino | H04M 15/43 455/408 |
| 2014/0273944 | A1* | 9/2014 | Ramprasad | H04M 15/723 455/406 |
| 2015/0312421 | A1* | 10/2015 | Leemet | H04W 4/70 379/114.03 |

(Continued)

OTHER PUBLICATIONS

Wikipedia, "International Mobile Station Equipment Identity," https://en.wikipedia.org/wiki/International_Mobile_Station_Equipment_Identity, Aug. 26, 2016, 5 pages.

(Continued)

*Primary Examiner* — Jaime M Holliday

(57) ABSTRACT

A first device may receive a device identifier and associated data usage identifiers. The associated data usage identifiers may be associated with data used to provision services via a second device. The first device may identify account identifiers associated with the device identifier. The account identifiers may be associated with the services. The first device may associate the data usage identifiers with the account identifiers. The first device may determine information indicating an amount of data used to cause the first device to perform an action. The first device may perform the action based on the information.

20 Claims, 6 Drawing Sheets

(56) References Cited

U.S. PATENT DOCUMENTS

2015/0312422 A1* 10/2015 Leemet ................ H04L 41/082
455/406
2017/0026817 A1* 1/2017 Levine .................... H04W 4/24

OTHER PUBLICATIONS

Wikipedia, "Subscriber identity module," https://en.wikipedia.org/wiki/Subscriber_identity_module, Sep. 6, 2016, 14 pages.
NEXNET Solutions, "Charging Gateway Function," http://nexnetsolutions.com/solutions/telecom-service-providers/oss-bss-solutions/charging-gateway/, Jul. 16, 2013, 5 pages.

* cited by examiner

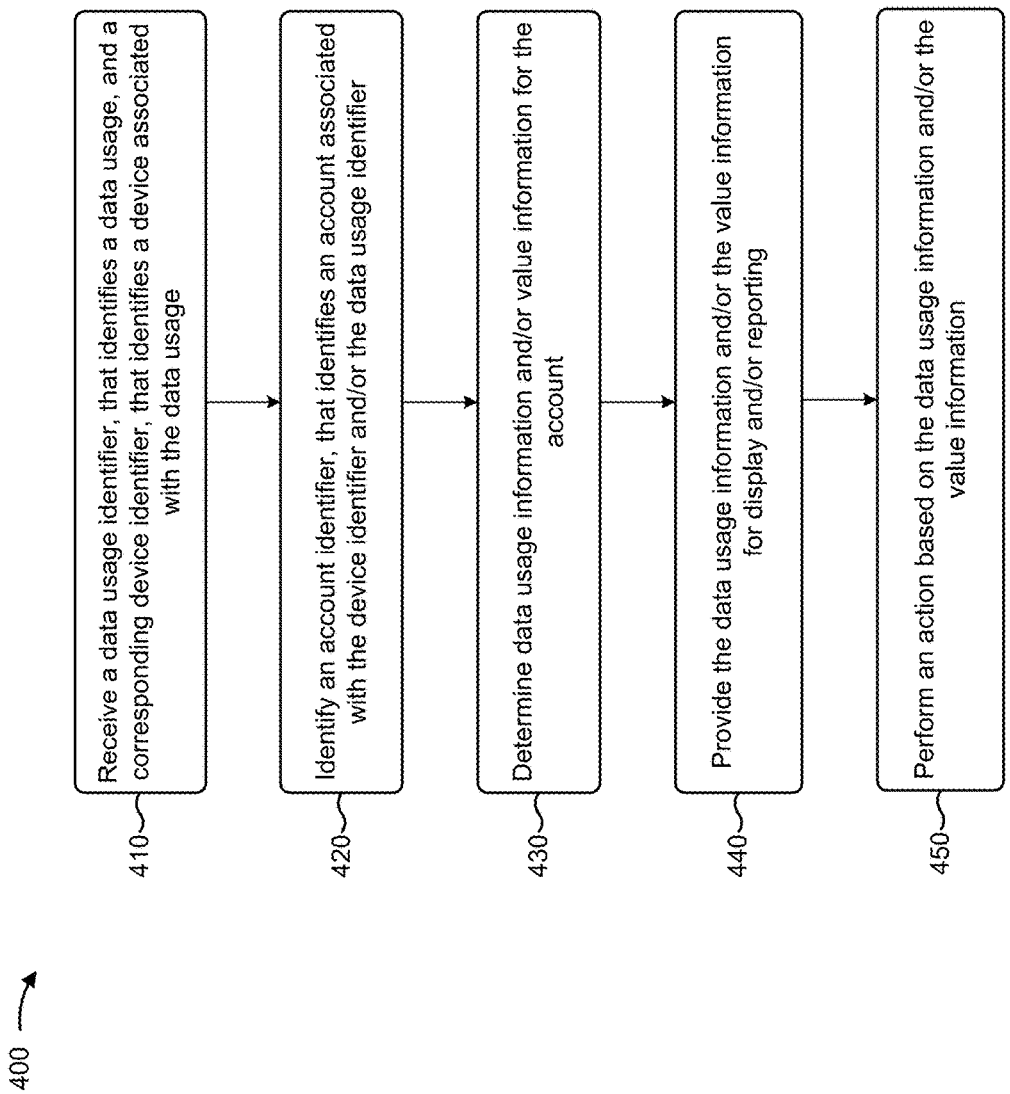

SEGMENTING DATA USAGE OF A DEVICE TO ASSOCIATE THE DATA USAGE WITH AN ACCOUNT

BACKGROUND

A user device may be identified by one or more identifiers. For example, the user device may be identified by a mobile directory number (MDN), a mobile identification number (MIN), an international mobile subscriber identity (IMSI), or the like. A network operator may use the one or more identifiers to record information associated with a particular user device. For example, the network operator may use the one or more identifiers to associate information with the user device.

BRIEF DESCRIPTION OF THE DRAWINGS

FIG. 4 is a flow chart of an example process for segmenting data usage of a device to associate the data usage with one or more accounts and/or subaccounts.

DETAILED DESCRIPTION OF PREFERRED EMBODIMENTS

The following detailed description of example implementations refers to the accompanying drawings. The same reference numbers in different drawings may identify the same or similar elements.

A network operator may record data usage (e.g., byte usage) associated with a user device (e.g., a smart phone or a tablet computer). For example, the network operator may record an amount of data consumed during exchange of short message service (SMS) text messages, web browsing, and/or application updates. The network operator may use an identifier that identifies the user device (e.g., a unique identifier, a mobile directory number (MDN), an international mobile subscriber identity (IMSI), an integrated circuit card identifier (ICCID), or an international mobile equipment identity (IMEI)) when recording the data usage. For example, the network operator may use a data structure to store information indicating the amount of data consumed by a particular user device and the identifier of the user device. The network operator may use the data structure to determine values (e.g., charges) for an account, associated with the user device, for the data usage. However, the network operator may lack a technique for determining values for multiple accounts, associated with the user device, for different types of data usage.

Implementations described herein enable a server device (e.g., associated with a network operator) to segment data usage from a single user device to determine values and allocations for multiple accounts, associated with the user device, for the data usage. This enables network operators to determine the correct value to apply to the multiple accounts for data usage associated with the single user device, thereby permitting dynamic and/or flexible association of data usage to the single device. The implementations described herein conserve processing resources, enable efficient segmentation of data usage by automatically segmenting data usage and improve information storage.

Figure 1A:
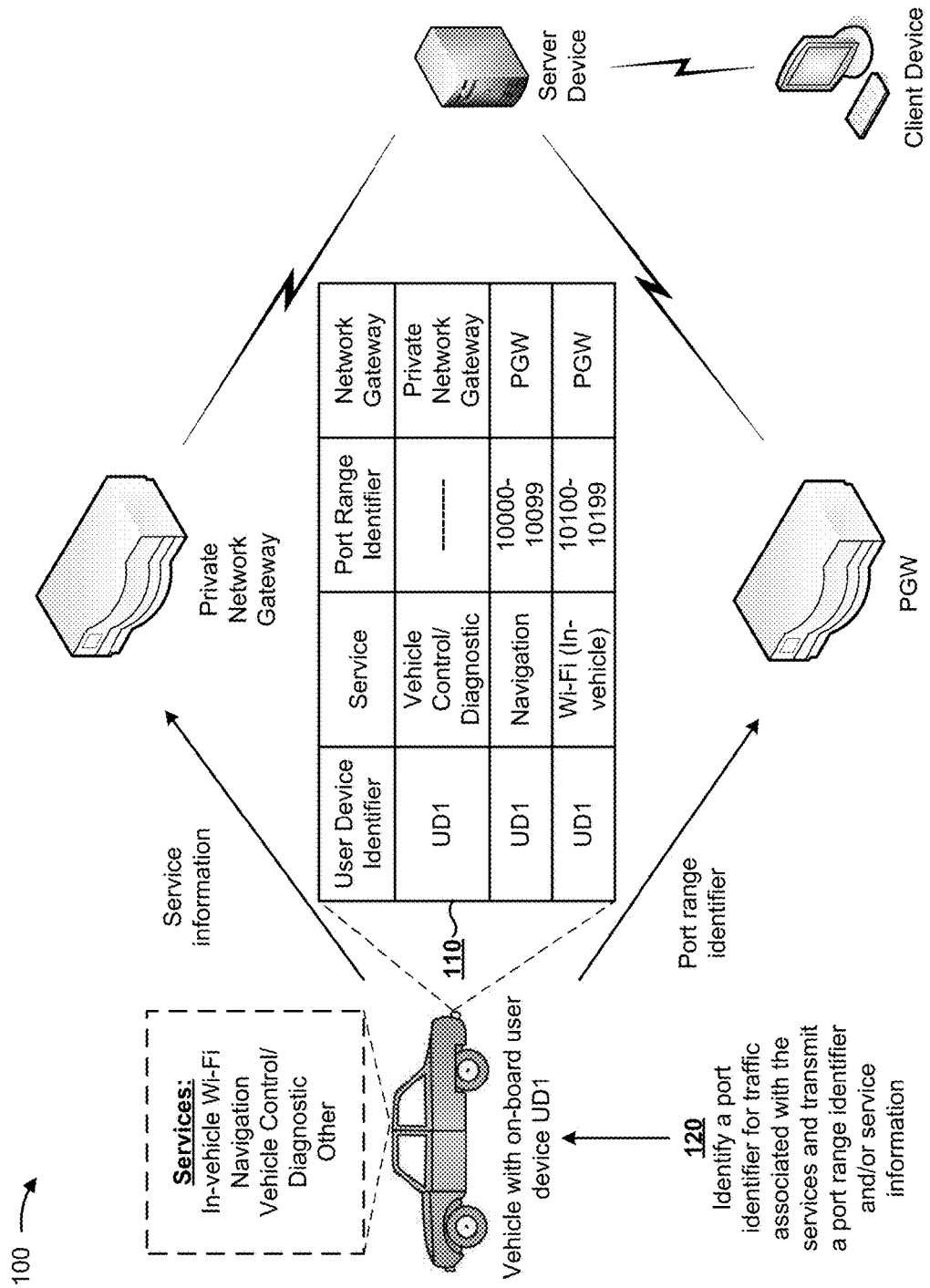
FIGS. 1A-1C are diagrams of an overview of an example implementation described herein.
Figure 1B:
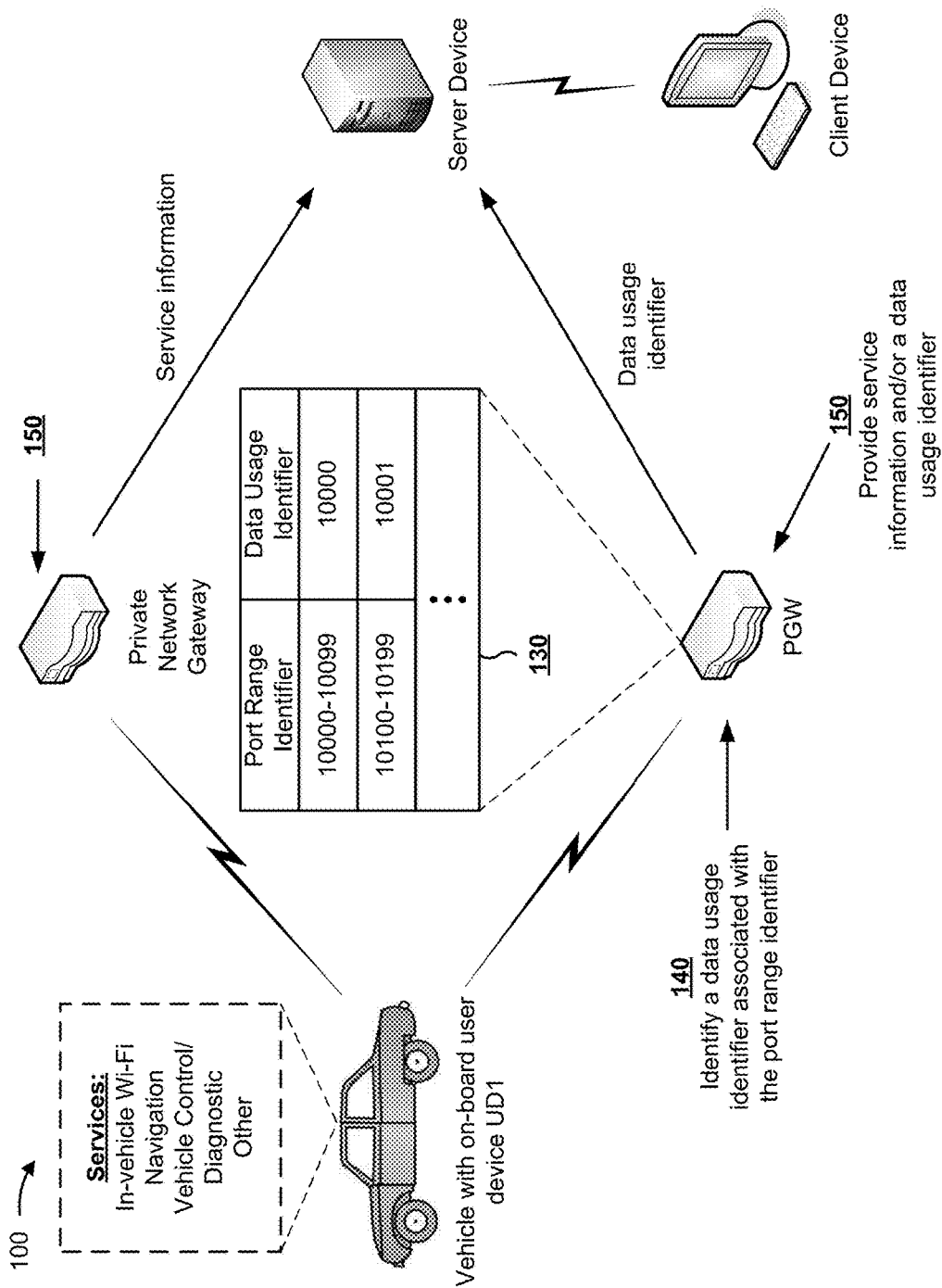
Figure 1C:
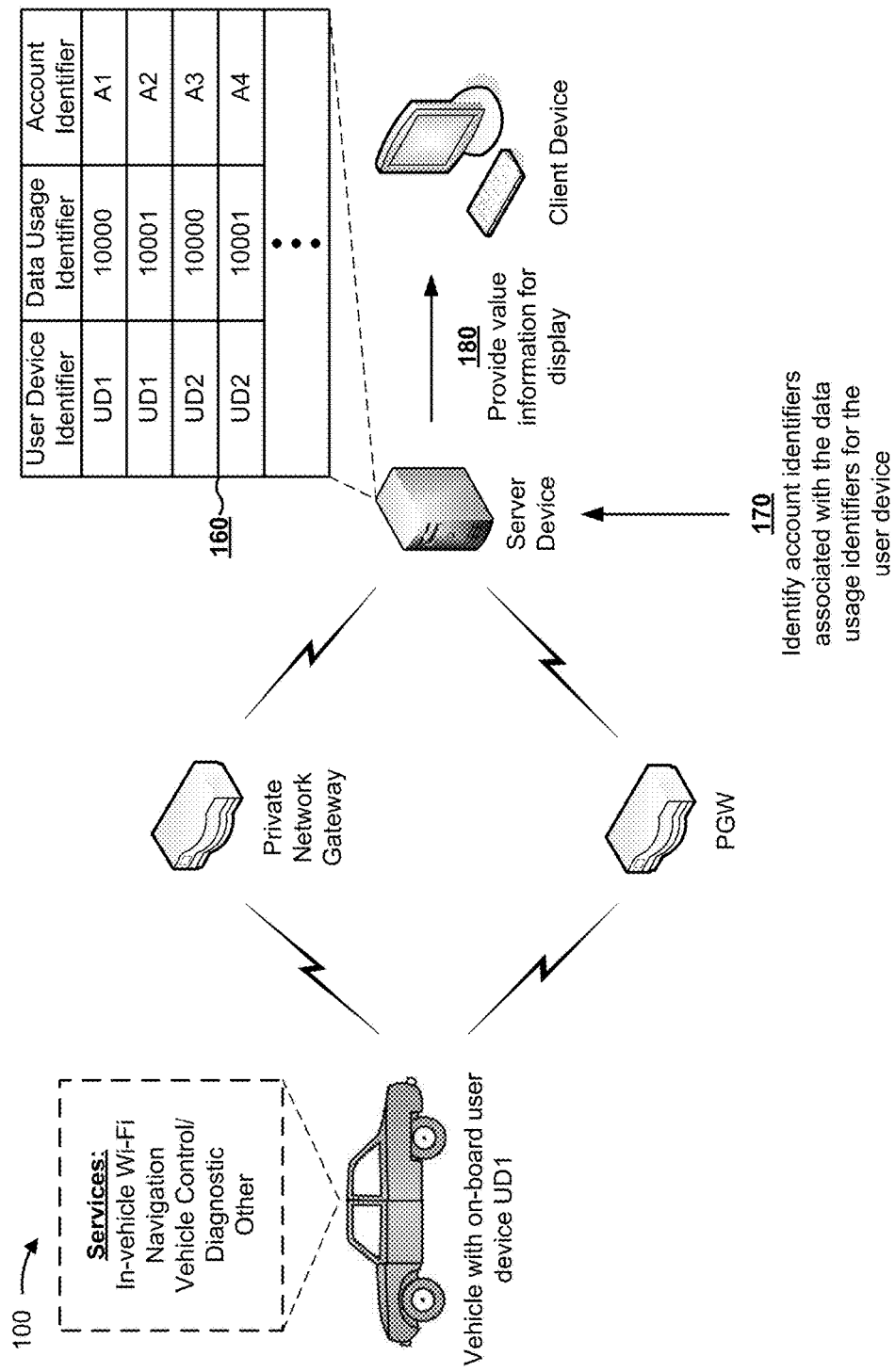

FIGS. 1A-1C are diagrams of an overview of an example implementation 100 described herein. As shown in FIG. 1A, a vehicle (e.g., a car, a motorcycle, a truck, a boat, an airplane, a train, etc.) may be equipped with an on-board user device UD1, such as a smart head unit. User device UD1 may be configured to provide a service, such as an in-vehicle Wi-Fi service, a navigation service, a vehicle control/diagnostic service, or another type of service (e.g., a service associated with a catch-all group of services or an unknown service).

As shown in FIG. 1A, and by reference number 110, user device UD1 may store a data structure that includes device identifiers that identify a user device, information identifying a service being provided via the user device, a port range identifier that identifies a range of ports for data traffic associated with the service, and a network gateway identifier, such as an access point name (APN) (e.g., a class 3 APN or a class 6 APN), that identifies a network gateway to which data traffic is transmitted. For example, the data structure may identify a private network gateway for a private network, where data usage is not segmented (e.g., not associated with, or allocated to, different accounts, not categorized according to service or port related to the data usage, etc.), and a packet data network gateway (PGW) for a non-private network, where data usage is segmented (e.g., associated with, or allocated to, different accounts, categorized according to service or port related to the data usage, etc.).

Assume for FIGS. 1A-1C that user device UD1 is providing a service and that user device UD1 is using data when providing the service. Further assume that user device UD1 may simultaneously provide data traffic via multiple network gateways (e.g., by providing first data traffic via a private network gateway identified by a class 6 APN and by providing second data traffic via a PGW identified by a class 3 APN).

As further shown in FIG. 1A, and by reference number 120, user device UD1 may identify a port identifier that identifies an egress port for data traffic associated with a service. For example, user device UD1 may identify port identifier 10000 for data traffic associated with a navigation service (e.g., by using the data structure stored by user device UD1). In some cases, user device UD1 may not identify a port range identifier for the data traffic. For example, user device UD1 may not identify a port range identifier for data traffic associated with vehicle control/diagnostic services, such as when the data traffic is destined for a private network (e.g., a private network of a vehicle manufacturer).

As further shown by reference number 120, user device UD1 may transmit a port range identifier that identifies a range of port identifiers that includes the port identifier, and/or service information (e.g., an amount of data consumed, information identifying the service, etc.). For example, user device UD1 may transmit port range identifier 10000-10099 for data traffic associated with a navigation service to a PGW. As another example, user device UD1 may transmit service information to a private network gateway (e.g., a gateway for a third-party network or a mobile private network (MPN)). User device UD1 may transmit data traffic associated with a service when transmitting the port range identifier and/or the service information.

As shown in FIG. 1B, and by reference number 130, the PGW may use a data structure to store information associated with the data traffic. For example, the data structure may include a port range identifier and a data usage identifier that identifies a type of data usage (e.g., a type of data usage based on the service associated with the data usage or a type of data usage based on an egress port via which data traffic is transmitted).

As shown by reference number 140, the PGW may identify a data usage identifier associated with the port range identifier received from user device UD1 (e.g., by using the data structure stored by the PGW). For example, user device UD1 may identify data usage identifier 10000 for port range identifier 10000-10099 received from user device UD1. As another example, the PGW may identify data usage identifier 10001 for port range identifier 10100-10199 received from user device UD1. A data usage identifier may be reused (e.g., repurposed or reassigned), which permits flexible and/or scalable use of the data usage identifier. For example, data usage identifier 10000 may be reassigned to a port range identifier different from port range identifier 10000-10099. As another example, data usage identifier 10000 may be reassigned to a type of data usage or service different from navigation services. As another example, a data usage identifier may be associated with multiple port range identifiers, multiple services, or multiple service providers.

As shown by reference number 150, the PGW and/or the private network gateway may provide the service information and/or a data usage identifier to a server device (e.g., a server device associated with a network operator). For example, the private network gateway may provide the service information to the server device. As another example, the PGW may provide the data usage identifier to the server device. In addition, the private network gateway and/or the PGW may provide data traffic, associated with a service, to the server device when providing the service information and/or the data usage identifier to the server device.

As shown in FIG. 1C, and by reference number 160, the server device may use a data structure to store information associated with data usage identifiers and/or account identifiers. For example, the server device may store device identifiers, data usage identifiers, and/or account identifiers that identify accounts for which data usage is to be associated and/or for which a value of the data usage is to be determined. As shown by reference number 170, the server device may identify account identifiers associated with data usage identifiers for the user device. For example, the server device may identify account identifier A1 for data usage identifier 10000 for user device UD1. As another example, the server device may identify account identifier A2 for data usage identifier 10001 for user device UD1.

As shown by reference number 180, the server device may provide value information for display via a client device. For example, the server device may provide information indicating an amount of data used to provide the service, a monetary amount due for the data usage related to the service, an account identifier for an account responsible for paying the monetary amount, a time period for the data usage, or the like. The server device may provide value information for different data usages to be associated with different accounts of a single user device. For example, the server device may provide the value information for data usage identifier 10000 for user device UD1 to a client device associated with account identifier A1 and/or a service provider and the value information for data usage identifier 10001 for user device UD1 to a client device associated with account identifier A2 and/or another service provider.

As another example, the server device may provide value information for data usage via a private network (e.g., data traffic received from the private network gateway) to an account associated with paying for the data usage via the private network, thereby enabling the server device to maintain separate value information for data usage via a private network and data usage via a non-private network. Separate value information may be maintained in situations where data traffic intended for a private network gateway was provided to a non-private network gateway, such as the PGW (e.g., due to an erroneous transmission).

In this way, a server device may segment data usage for a single user device and determine values for the data usage for different user accounts (e.g., by segmenting a single APN into multiple data usages associated with multiple accounts using an algorithm). This permits dynamic and/or flexible determination of a value for data usage by enabling segmentation of data usage and multi-account value determination. This conservation of processing resources enables an efficient segmentation of data usage by automatically segmenting the data usage.

As indicated above, FIGS. 1A-1C are provided merely as an example. Other examples are possible and may differ from what was described with regard to FIGS. 1A-1C. Although, FIGS. 1A-1C are described with reference to an on-board user device in a vehicle, the user device may include a machine-to-machine (M2M) device and/or an Internet of Things (IoT) device, as described elsewhere herein.

Figure 2:
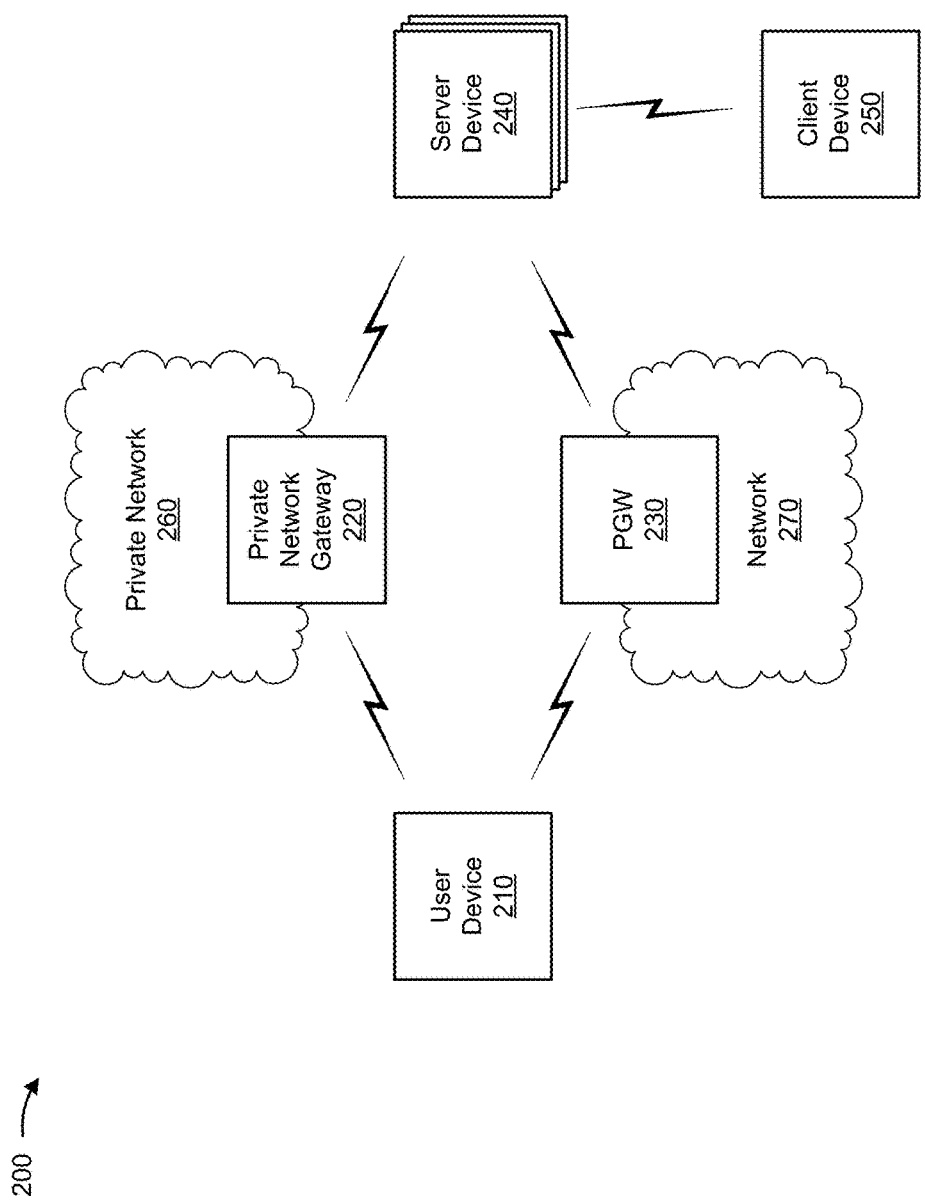
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 210, a private network gateway 220, a PGW 230, one or more server devices 240 (hereinafter referred to individually as "server device 240," and collectively as "server devices 240"), a client device 250, a private network 260, and a network 270. Devices of environment 200 may interconnect via wired connections, wireless connections, or a combination of wired and wireless connections.

User device 210 includes one or more devices capable of receiving, generating, storing, processing, and/or providing information associated with segmenting data usage related to a service. For example, user device 210 may include a communication and/or computing device, such as a mobile phone (e.g., a smart phone or a radiotelephone), a laptop computer, a tablet computer, a wearable communication device (e.g., a smart wristwatch, a pair of smart eyeglasses, or an activity band), an on-board device in a vehicle (e.g., a smart head unit or a transmission control unit), a gaming device, or a similar type of device. As another example, user device 210 may include an M2M and/or an IoT device, such as a thermostat, a lightbulb, a garage door opener, a light switch, a refrigerator, a medical device, a biometric device, a vehicle, and/or a similar type of device. In other words, user device 210 may be any "thing" in the IoT. In some implementations, user device 210 may identify different data usages associated with services provided via user device 210, as described elsewhere herein. Additionally, or alternatively, user device 210 may provide information identifying the different data usages and/or a port associated with data traffic for the services to private network gateway 220 and/or PGW 230, as described elsewhere herein.

In some implementations, user device 210 may include one or more devices performing network address translation (NAT). For example, user device 210 may receive data traffic from a source (e.g., an application of user device 210, a sensor of user device 210, a screen of user device 210, a user interface provided for display by user device 210, etc.) and may determine an internet protocol (IP) address for the source and/or data traffic from the source. Additionally, or alternatively, user device 210 may assign a virtual local area network (VLAN) to the source and/or the data traffic. Additionally, or alternatively, user device 210 may route the data traffic via a port (e.g., an egress port) of user device 210.

Private network gateway 220 includes one or more devices capable of receiving, providing, storing, generating, and/or processing information. For example, private network gateway 220 may include a data processing and/or traffic transfer device, such as a gateway (e.g., a software-defined network (SDN) gateway or an evolved packet data gateway (ePDG)), a router, a modem, a switch, a firewall, a network interface card (NIC), a virtual private network (VPN) concentrator, an optical add-drop multiplexer (OADM), a bridge, a hub, a server (e.g., a proxy server, a web server, a host server, a storage server, or a server in a data center or a cloud computing environment), a reverse proxy, and/or a similar type of device. In some implementations, private network gateway 220 may receive information associated with data usage from user device 210, as described elsewhere herein. Additionally, or alternatively, private network gateway 220 may provide the information to server device 240, as described elsewhere herein.

PGW 230 includes one or more devices capable of providing connectivity for user device 210 to a packet data network, such as network 270. For example, PGW 230 may include one or more data processing and/or traffic transfer devices, such as a gateway, a router, a modem, a switch, a firewall, a NIC, a hub, a bridge, a server device, an OADM, or any other type of device that processes and/or transfers traffic. In some implementations, PGW 230 may aggregate traffic (e.g., data traffic) received from one or more user devices 210, and may send the traffic to server device 240, as described elsewhere herein. Additionally, or alternatively, PGW 230 may record data usage information (e.g., byte usage), and may provide the data usage information to server device 240, as described elsewhere herein.

Server device 240 includes one or more devices capable of storing, processing, and/or routing information associated with data usage. For example, server device 240 may include a server (e.g., in a data center or a cloud computing environment), a data center (e.g., a multi-server micro data center), a workstation computer, a virtual machine (VM) provided in a cloud computing environment, a data mediation device, a policy server, a charging gateway function, a policy and charging rules function (PCRF), and/or a similar type of device. In some implementations, server device 240 may include a communication interface that allows server device 240 to receive information from and/or transmit information to other devices in environment 200. In some implementations, server device 240 may receive information associated with data usage from private network gateway 220 and/or PGW 230, as described elsewhere herein. Additionally, or alternatively, server device 240 may provide information associated with data usage to client device 250 (e.g., for display via a display of client device 250), as described elsewhere herein.

Client device 250 includes one or more devices capable of receiving, generating, storing, processing, and/or providing information associated with data usage. For example, client device 250 may include a communication and/or computing device, such as a desktop computer, a mobile phone (e.g., a smart phone or a radiotelephone), a laptop computer, a tablet computer, a gaming device, a wearable communication device (e.g., a smart wristwatch, a pair of smart eyeglasses, or an activity band), or a similar type of device. In some implementations, client device 250 may receive, from server device 240, information associated with data usage, as described elsewhere herein. Additionally, or alternatively, client device 250 may provide the information received from server device 240 for display via a display of client device 250, as described elsewhere herein.

Private network 260 includes one or more wired and/or wireless networks. For example, private network 260 may include a private network (e.g., a mobile private network (MPN)), a cellular network (e.g., a long-term evolution (LTE) network, a 3G network, or a code division multiple access (CDMA) network), a public land mobile network (PLMN), a local area network (LAN), a wide area network (WAN), a metropolitan area network (MAN), a telephone network (e.g., the Public Switched Telephone Network (PSTN)), an ad hoc network, an intranet, the Internet, a fiber optic-based network, a cloud computing network, or the like, and/or a combination of these or other types of networks.

Network 270 includes one or more wired and/or wireless networks. For example, network 270 may include a cellular network (e.g., an LTE network, a 3G network, a CDMA network, or any 3rd Generation Partnership Project (3GPP) network), a PLMN, a LAN, a WAN, a MAN, a telephone network (e.g., the PSTN), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
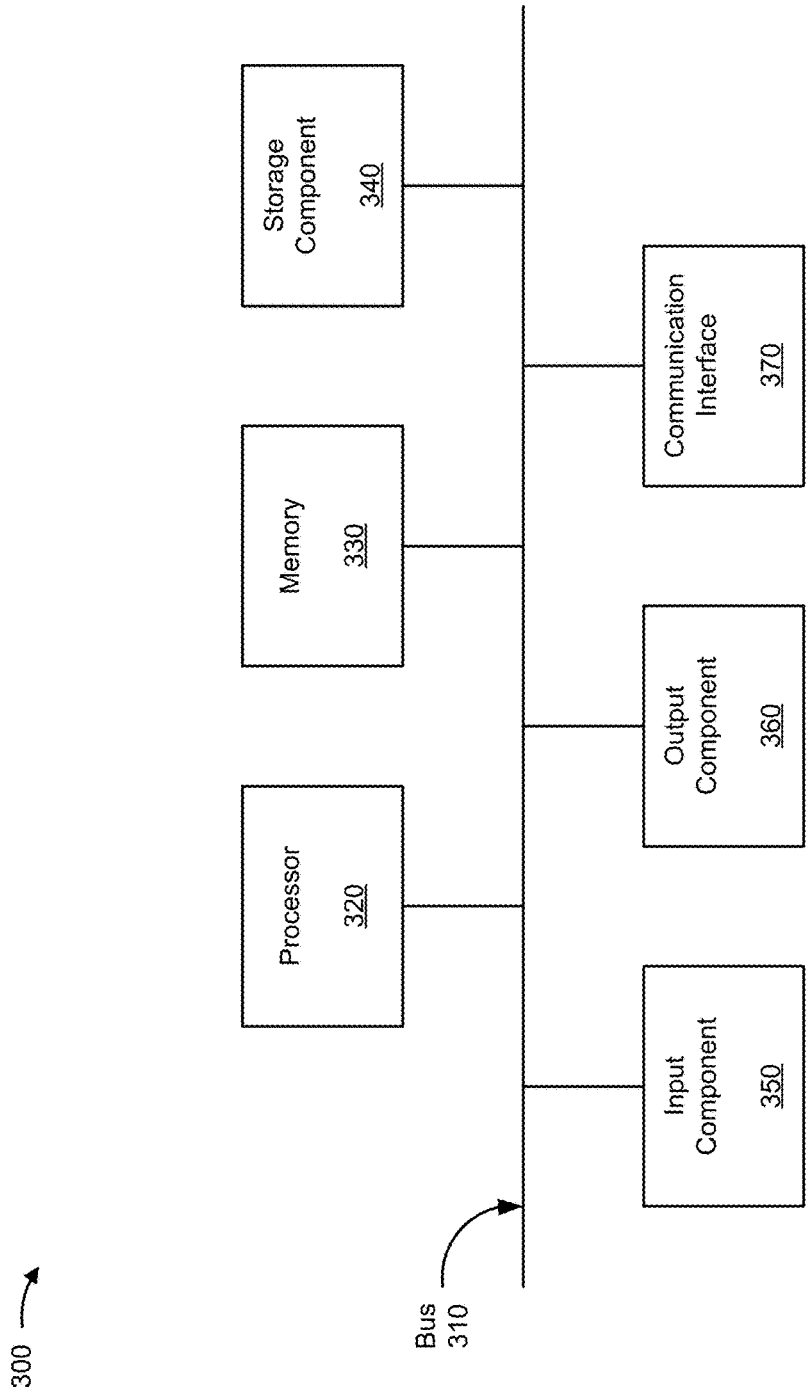
FIG. 3 is a diagram of example components of one or more devices of FIG. 2.

FIG. 3 is a diagram of example components of a device 300. Device 300 may correspond to user device 210, private network gateway 220, PGW 230, server device 240, and client device 250. In some implementations, user device 210, private network gateway 220, PGW 230, server device 240, and client device 250 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a processor (e.g., a central processing unit (CPU), a graphics processing unit (GPU), and/or an accelerated processing unit (APU)), a microprocessor, and/or any processing component (e.g., a field-programmable gate array (FPGA) and/or an application-specific integrated circuit (ASIC)) that interprets and/or executes instructions. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for segmenting data usage of a device to associate the data usage with one or more accounts and/or subaccounts. In some implementations, one or more process blocks of FIG. 4 may be performed by server device 240. In some implementations, one or more process blocks of FIG. 4 may be performed by another device or a group of devices separate from or including server device 240, such as user device 210, private network gateway 220, PGW 230, and client device 250.

As shown in FIG. 4, process 400 may include receiving a data usage identifier, that identifies a data usage, and a corresponding device identifier, that identifies a device associated with the data usage (block 410). For example, server device 240 may receive one or more data usage identifiers and a corresponding device identifier from private network gateway 220 and/or PGW 230 based on private network gateway 220 and/or PGW 230 tagging data traffic from user device 210 with the one or more data usage identifiers and/or the device identifier. In some implementations, server device 240 may receive data usage identifiers periodically, according to a schedule, based on requesting the data usage identifiers, or the like.

In some implementations, a data usage identifier may identify a particular data usage (e.g., a byte usage, such as byte usage associated with browsing the Internet, using an application installed on, or executing on, user device 210, completing a voice call, exchanging SMS messages, etc.), a particular data usage or data traffic category for data traffic transmitted to and/or from user device 210, or the like. For example, the data usage identifier may identify a data usage associated with a service provided via user device 210 (e.g., an in-vehicle Wi-Fi service, a navigation service, an infotainment service, a vehicle control/diagnostic service, or a remote access service). As another example, the data usage identifier may be associated with multiple services provided via user device 210 (e.g., multiple services provided simultaneously, separately, etc.), thereby enabling scalable use of the data usage identifier to accommodate multiple services.

In some implementations, server device 240 may receive a single data usage identifier. In some implementations, server device 240 may receive multiple data usage identifiers. In some implementations, when receiving multiple data usage identifiers, server device 240 may receive multiple data usage identifiers for a single user device 210. For example, server device 240 may receive multiple data usage identifiers associated with a single device identifier (e.g., an identifier that identifies user device 210, such as a mobile directory number (MDN), an integrated circuit card identifier (ICCID), or an international mobile equipment identity (IMEI)). Additionally, or alternatively, server device 240 may receive multiple data usage identifiers for multiple user devices 210. For example, server device 240 may receive multiple data usage identifiers associated with a first device identifier and multiple data usage identifiers associated with a second device identifier.

In some implementations, server device 240 may receive the data usage identifier and/or the device identifier when another device identifies the device identifier associated with the data usage identifier and provides the data usage identifier and the device identifier to server device 240. For example, another server device 240, such as a data mediation device or a charging gateway, may use a data structure that includes the device identifier and other identifiers associated with user device 210, such as a model or manufacturer identifier that identifies a model or manufacturer of user device 210 or an identifier that identifies whether data usage segmentation is permitted for user device 210, to identify the device identifier. Continuing with the previous example, in some implementations, when providing the data usage identifier and/or the device identifier to server device 240, the other server device 240 may tag data traffic destined for server device 240 with the data usage identifier and/or the device identifier.

In some implementations, server device 240 may receive the data usage identifier when PGW 230 identifies the data usage identifier. For example, PGW 230 may receive, from user device 210, a port identifier that identifies a port (e.g., an egress port), or a range of ports, of user device 210 via which data traffic associated with a service is transmitted and may identify a data usage identifier associated with the port identifier (e.g., by using a data structure, by using a rule, or by using a policy received from a PCRF). In some implementations, PGW 230 may receive the port identifier when user device 210 identifies the port identifier. For example, PGW 230 may receive the port identifier when user device 210 identifies an egress port associated with data traffic transmitted by user device 210, such as when user device 210 is providing a service, and provides the port identifier to PGW 230 (e.g., by tagging data traffic destined for PGW 230 with the port identifier).

Additionally, or alternatively, server device 240 may receive the data usage identifier, or other information associated with data usage, from private network gateway 220. For example, server device 240 may receive information identifying private network 260 and/or an identifier that identifies private network gateway 220, such as an access point name (APN). In some implementations, server device 240 may receive a data usage identifier from private network gateway 220 that identifies that the data traffic was provided via private network gateway 220 based on the data traffic being provided via private network 260 (e.g., rather than being provided via network 270).

In some implementations, server device 240 may receive an indication that an account is associated with a subscription to a service (e.g., prior to receiving a data usage identifier). For example, server device 240 may receive the indication from user device 210 and/or client device 250. In some implementations, when server device 240 receives the indication, server device 240 may map an account identifier identifying the account and a data usage identifier associated with the service, thereby enabling server device 240 to identify a particular account for a particular data usage or service (e.g., for purposes of determining a value associated with the data usage or with providing the service).

As further shown in FIG. 4, process 400 may include identifying an account identifier, that identifies an account associated with the device identifier and/or the data usage identifier (block 420). For example, server device 240 may identify multiple account identifiers, that identify multiple accounts, such as multiple shared accounts, multiple accounts of a shared account, multiple primary accounts, and/or a primary account and multiple secondary accounts (e.g., where only a subset of user device 210 features are available to the secondary accounts), associated with the device identifier and/or the one or more data usage identifiers. In some implementations, server device 240 may identify the account identifier in association with receiving the data usage identifier (e.g., from private network gateway 220 and/or PGW 230).

In some implementations, an account identifier may identify an account associated with user device 210. For example, the account identifier may identify a corporate account, a user account, a subscriber account (e.g. that is associated with a subscription to a service), or an account that is responsible for payment for data usage related to a service.

In some implementations, multiple accounts may be associated with user device 210. For example, a first account and a second account may be associated with a first user device 210. In some implementations, the multiple accounts may be associated with multiple services and/or data usage related to the multiple services. For example, a first account may be associated with a first service and a second account may be associated with a second service. In some implementations, each of the multiple accounts may be associated with a different service. For example, a first service associated with a first account may be different (e.g., associated with different functionality of user device 210, provided by different service providers, etc.) from a second service associated with a second account. This enables server device 240 and/or another device to segment data usage for multiple and/or different services. In addition, this enables server device 240 to associate (e.g., allocate, assign, etc.) the data usage for different services to different accounts of a single user device 210.

In some implementations, server device 240 may store one or more account identifiers using a data structure. For example, server device 240 may use a data structure that includes a device identifier, one or more data usage identifiers associated with the device identifier, and one or more account identifiers associated with the one or more data usage identifiers. In some implementations, server device 240 may use the data structure to identify an account identifier associated with a particular device identifier (e.g., a device identifier received from private network gateway 220 and/or PGW 230). Additionally, or alternatively, server device 240 may use the data structure to identify a data usage identifier associated with an account identifier.

In some implementations, the data structure may indicate a relationship between user device 210, data usage from services provided via user device 210, and/or an account associated with user device 210. For example, the data structure may indicate that values are to be determined for a particular account for data usage from particular services provided via user device 210. As another example, the data structure may indicate that user device 210 provides data traffic for a first service via a first port and that user device 210 provides the data traffic via private network 260. As another example, the data structure may indicate that user device 210 provides data traffic for a first service via a first port and via network 270 and that the data traffic is associated with a first data usage identifier. As another example, the data structure may indicate that data traffic associated with an unknown service (e.g., a service for which the data structure lacks a record) is associated with a particular data usage identifier.

In some implementations, server device 240 may allocate data usage to an account (e.g., by associating a data usage identifier with an account identifier). For example, server device 240 may allocate data usage to a first account by associating a first data usage identifier to a first account identifier that identifies the first account.

In some implementations, server device 240 may aggregate one or more data usage identifiers for an account identifier (e.g., in association with, or prior to, identifying the account identifier). For example, server device 240 may aggregate a first data usage identifier associated with a first service and a second data usage identifier associated with the first service for an account identifier. As another example, server device 240 may aggregate a first data usage identifier associated with a first service and a second data usage identifier associated with a second service for an account identifier. In some implementations, server device 240 may aggregate the one or more data usage identifiers for an account identifier based on matching the account identifier and/or based on matching the one or more data usage identifiers.

In this way, server device 240 may automatically identify multiple accounts associated with data usage of user device 210. This enables automatic segmentation of data usage for multi-account value determination, thereby conserving processing resources and/or enabling an efficient segmentation of data usage.

As shown in FIG. 4, process 400 may include determining data usage information and/or value information for the account (block 430). For example, server device 240 may determine the data usage information and/or the value information for the account. In some implementations, server device 240 may determine the data usage information and/or the value information for the account based on identifying the account identifier.

In some implementations, server device 240 may determine data usage information. For example, server device 240 may determine information associated with data usage, such as a total amount of data used (e.g., in a time period, for a particular service, for services associated with an account, etc.) or an amount of data remaining in a pool of data (e.g., for a time period, for an account, etc.). Additionally, or alternatively, server device 240 may determine value information. For example, server device 240 may determine an amount of money due for data usage (e.g., by multiplying an amount of data usage by a per unit, a per kilobyte (KB), or a per megabyte (MB) price for the data usage), may identify a time period covered by a value report (e.g., a report of values for services provided, for data used to provide the services, etc.), or may identify an account for which values are to be determined for data usage.

In some implementations, server device 240 may determine the data usage information and/or the value information in association with identifying the account identifier. For example, server device 240 may determine the data usage information and/or the value information after determining that data usage for a particular user device 210 is associated with (e.g., to be charged to) a particular account. In some implementations, server device 240 may determine the data usage information and/or the value information based on querying information from another device (e.g., information indicating an amount of data used by user device 210, an amount of data usage for a service, etc.). In some implementations, server device 240 may determine the data usage information and/or the value information periodically, according to a schedule, based on receiving a request to determine the data usage information and/or the value information (e.g., from a user of client device 250), etc.

In this way, server device 240 may automatically determine data usage information and/or value information, such as to invoice, or debit, multiple accounts, associated with a single user device 210, for data usage related to services provided via user device 210. This conserves processing resources by enabling server device 240 to quickly and/or efficiently determine data usage information and/or value information for segmented data usage associated with user device 210. In addition, this increases an efficiency of storing data usage information and/or value information by enabling server device 240 to use data usage identifiers that can be associated with multiple data usages, multiple services, and/or multiple service providers (e.g., rather than using different data usage identifiers for each data usage, service, or service provider).

As further shown in FIG. 4, process 400 may include providing the data usage information and/or the value information for display and/or reporting (block 440). For example, server device 240 may provide the data usage information and/or the value information for display (e.g., for display via a display of user device 210 and/or client device 250). In some implementations, server device 240 may provide the data usage information and/or the value information based on determining the data usage information and/or the value information for the account.

In some implementations, server device 240 may provide the data usage information and/or the value information to another device (e.g., to use the data usage information and/or the value information, such as to debit an account). For example, server device 240 may provide the data usage information to another server device 240 to permit the other server device 240 to determine a value and/or to invoice an account (e.g., by debiting the account). This aids with the conservation of processing resources of server device 240 by reducing or eliminating the need for server device 240 to have functionality to determine a value or to perform functions related to determining a value.

In some implementations, server device 240 may store the data usage information and/or the value information. For example, server device 240 may store the data usage information and/or the value information in a manner that permits a user of user device 210 and/or client device 250 to view and/or access the data usage information and/or value information using user device 210 and/or client device 250.

As further shown in FIG. 4, process 400 may include performing an action based on the data usage information and/or the value information (block 450). For example, server device 240 may perform the action based on the data usage information and/or the value information. In some implementations, server device 240 may perform the action in association with determining the data usage information and/or the value information.

In some implementations, when performing the action, server device 240 may transmit a message. For example, server device 240 may transmit a message to user device 210 and/or client device 250. In some implementations, server device 240 may transmit a message that includes the data usage information and/or the value information. In some implementations, server device 240 may transmit the message periodically, according to a schedule, or based on a request from another device. For example, server device 240 may transmit the message at the beginning of a time period, at the end of a time period, at a particular time of day or day of the week, etc. Additionally, or alternatively, server device 240 may transmit the message when a threshold is satisfied. For example, server device 240 may transmit the message when data usage for a service, data usage for user device 210, and/or an amount due for the data usage satisfies a threshold.

In some implementations, when performing the action, server device 240 may restrict or prevent user device 210 from using data (e.g., by transmitting a message or a command to user device 210, private network gateway 220, and/or PGW 230). For example, server device 240 may restrict or prevent user device 210 from using data by restricting or preventing data traffic for a particular service provided via user device 210, such as when data usage associated with the particular service satisfies a threshold, when a total amount of data used by user device 210 satisfies a threshold, based on time of day or day of the week, etc.

Similarly, as another example, server device 240 may restrict or prevent private network gateway 220 and/or PGW 230 from transmitting data traffic to and/or from user device 210 for a particular service, such as by sending a message, an instruction, or a command to private network gateway 220 and/or PGW 230. In some implementations, server device 240 may restrict or prevent user device 210 from using data by reducing or eliminating transmissions of background data, preventing a particular type of data usage, such as web browsing, SMS messages, or the like.

Additionally, or alternatively, server device 240 may restrict or prevent a service from being provided via user device 210. For example, server device 240 may transmit a message and/or a command to user device 210 to prevent user device 210 from providing a particular service. In some implementations, the message and/or the command may cause user device 210 to disable an application (e.g., an application installed on user device 210, executing on user device 210, and/or executing remotely from user device 210), a user interface, or a portion thereof, or the like, associated with the service. In some implementations, when server device 240 is restricting or preventing a service from being provided via user device 210, server device 240 may prevent a particular service and/or a particular type of service (e.g., navigation services, infotainment services, or remote access services) from being provided via user device 210.

In some implementations, when restricting or preventing user device 210 from using data and/or providing a service, server device 240 may do so according to a priority (e.g., a high priority, a medium priority, and/or a low priority). For example, server device 240 may reduce or eliminate data usage for a service associated with a low priority, such as an infotainment service, prior to reducing or eliminating data usage for a service associated with a medium priority or a high priority, such as a navigation service or an emergency communication service.

Additionally, or alternatively, when restricting and/or preventing user device 210 from using data and/or providing a service, server device 240 may do so according to a preference (e.g., a user preference or a default preference). For example, server device 240 may reduce or eliminate data usage for an infotainment service prior to reducing or eliminating data usage for a navigation service based on a user of user device 210 selecting one or more preferences to cause server device 240 to restricting data usage for an infotainment service prior to restricting data usage for a navigation service.

In some implementations, when performing the action, server device 240 may determine a value (e.g., by generating a report that identifies an amount due for data usage). For example, server device 240 may determine a value for data usage associated with an account. In some implementations, server device 240 may provide the value (e.g., in a value report) in association with determining the value. For example, server device 240 may provide the value report and/or the determined value for display via user device 210 and/or client device 250. In some implementations, server device 240 may perform an action based on the determined value. For example, server device 240 may automatically charge a bank account associated with the account. As another example, server device 240 may prevent user device 210 from providing the service by sending a message and/or a command to user device 210, such as when payment based on the determined value is overdue. As another example, server device 240 may send a message to user device 210 and/or client device 250 indicating that the value report is ready for review and/or that an amount of money based on the value is due.

In some implementations, when performing the action, server device 240 may provide the usage information and/or the value information for the account. In other words, block 450 may include block 440.

In this way, server device 240 conserves processing resources of user device 210 and/or data resources of user device 210 by reducing or eliminating data usage by user device 210 for a service provided via user device 210.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Implementations described herein enable a server device (e.g., associated with a network operator) to segment data usage for a user device and to determine values for different accounts for the data usage. This enables the server device to determine values for multiple accounts for data usage for a single user device, thereby permitting dynamic and/or flexible determination of a value for the data usage. In addition, this conserves processing resources and/or enables an efficient segmentation of data usage, by automatically segmenting the data usage for determination of a value of data usage for multiple accounts.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
   a memory; and
   one or more processors to:
      receive a device identifier and multiple data usage identifiers associated with the device identifier,
         the device identifier identifying a user device,
         the multiple data usage identifiers identifying multiple data usages associated with multiple services provided via the user device,
            the multiple services including one or more of:
               an in-vehicle Wi-Fi service,
               a navigation service,
               an infotainment service,
               a vehicle control/diagnostic service, or
               a remote access service,
         a first data usage identifier, of the multiple data usage identifiers, to identify whether data was provided via a private network or a non-private network, and
         a second data usage identifier, of the multiple data usage identifiers, being associated with one or more port identifiers that identify one or more ports of the user device,
            a first port, of the one or more ports, being associated with a first service of the multiple services,
            a second port, of the one or more ports, being associated with a second service of the multiple services, and
            the first service being different than the second service;
      identify multiple account identifiers associated with the device identifier and the multiple data usage identifiers,
         the multiple account identifiers identifying multiple accounts associated with the multiple services,
         a first account identifier, of the multiple account identifiers, that identifies a first account, of the multiple accounts, associated with the user device,
            the first account being associated with the first service,
         a second account identifier, of the multiple account identifiers, that identifies a second account, of the multiple accounts, associated with the user device,
            the second account being associated with the second service, and
            the first account and the second account being different accounts;
      allocate the multiple data usages to the multiple accounts associated with the user device based on identifying the multiple account identifiers;
      determine information associated with a data usage of the multiple data usages; and
      transmit a message based on the information.

2. The device of claim 1, where the one or more processors, when transmitting the message, are to:
   transmit the message to the user device to cause the user device to disable an application or a user interface of the user device based on the information.

3. The device of claim 1, where the one or more processors are further to:
   aggregate multiple data usage identifiers for an account identifier of the multiple account identifiers; and
   where the one or more processors, when determining the information, are to:
      determine the information based on the aggregated multiple data usage identifiers for the account identifier.

4. The device of claim 1, where the multiple data usage identifiers include:
   a third data usage identifier associated with the device identifier, and
   a fourth data usage identifier associated with the device identifier,
      the third data usage identifier and the fourth data usage identifier being associated with data usages for different services provided via the user device, and
   where the one or more processors, when identifying the multiple account identifiers, are to:
      identify a third account identifier associated with the third data usage identifier; and
      identify a fourth account identifier associated with the fourth data usage identifier.

5. The device of claim 1, where the one or more processors are further to:
   map the first account to a third data usage identifier and the second account to a fourth data usage identifier,
      the third data usage identifier being associated with a first data usage related to the first service, and
      the fourth data usage identifier being associated with a second data usage related to the second service.

6. The device of claim 1, where a third data usage identifier, of the multiple data usage identifiers, is associated with a first port identifier identifying the first port,
   a fourth data usage identifier, of the multiple data usage identifiers, is associated with a second port identifier identifying the second port, and
   where the one or more processors are further to:
      store a data structure to identify that the third data usage identifier is associated with the first account identifier and that the fourth data usage identifier is associated with the second account identifier.

7. The device of claim 1, where the one or more processors are further to:
   prevent an application, associated with the user device, from transmitting data.

8. A non-transitory computer-readable medium storing instructions, the instructions comprising:
one or more instructions that, when executed by one or more processors, cause the one or more processors to:
receive, from a first device, one or more device identifiers and multiple data usage identifiers,
the multiple data usage identifiers identifying data usage via one or more second devices identified by the one or more device identifiers,
a first data usage identifier, of the multiple data usage identifiers, to identify whether data was provided via a private network or a non-private network,
a second data usage identifier, of the multiple data usage identifiers, being associated with one or more port identifiers that identify one or more ports of a second device of the one or more second devices,
a first port, of the one or more ports, being associated with a first service,
a second port, of the one or more ports, being associated with a second service,
the first service including:
an in-vehicle Wi-Fi service,
a navigation service,
an infotainment service,
a vehicle control/diagnostic service, or
a remote access service, and
the second service including:
an in-vehicle Wi-Fi service,
a navigation service,
an infotainment service,
a vehicle control/diagnostic service, or
a remote access service, and
the first service being different than the second service;
identify multiple account identifiers associated with the multiple data usage identifiers,
the multiple account identifiers identifying multiple accounts associated with the second device,
a first account identifier, of the multiple account identifiers, that identifies a first account, of the multiple accounts, associated with the second device,
the first account being associated with the first service,
a second account identifier, of the multiple account identifiers, that identifies a second account, of the multiple accounts, associated with the second device,
the second account being associated with the second service, and
the first account and the second account being different accounts;
aggregate more than one data usage identifier of the multiple data usage identifiers for the first account identifier or the second account identifier to determine information associated with the data usage by the second device; and
transmit a message based on the information.

9. The non-transitory computer-readable medium of claim 8, where the one or more instructions, when executed by the one or more processors, further cause the one or more processors to:
map the multiple data usage identifiers and the multiple account identifiers; and
where the one or more instructions, that cause the one or more processors to identify the multiple account identifiers, cause the one or more processors to:
identify the multiple account identifiers based on mapping the multiple data usage identifiers and the multiple account identifiers.

10. The non-transitory computer-readable medium of claim 8, where the one or more instructions, when executed by the one or more processors, further cause the one or more processors to:
prevent an application, associated with the second device, from transmitting data.

11. The non-transitory computer-readable medium of claim 8, where the one or more instructions, when executed by the one or more processors, further cause the one or more processors to:
match a third account identifier associated with a third data usage identifier and a fourth account identifier associated with a fourth data usage identifier,
the third account identifier and the fourth account identifier identifying a same account; and
where the one or more instructions, that cause the one or more processors to aggregate the more than one data usage identifier, cause the one or more processors to:
aggregate the more than one data usage identifier based on matching the third account identifier and the fourth account identifier.

12. The non-transitory computer-readable medium of claim 8, where the one or more instructions, that cause the one or more processors to receive the one or more device identifiers and the multiple data usage identifiers, cause the one or more processors to:
receive a third data usage identifier and a fourth data usage identifier associated with a first device identifier of the one or more device identifiers,
the first data usage identifier and the second data usage identifier identifying different data usages associated with different services.

13. The non-transitory computer-readable medium of claim 8, where the one or more instructions, that cause the one or more processors to identify the multiple account identifiers, cause the one or more processors to:
identify the multiple account identifiers for the second device;
identify the multiple account identifiers for a third device; and
where the one or more instructions, that cause the one or more processors to aggregate the more than one data usage identifier, cause the one or more processors to:
aggregate the more than one data usage identifier for the second device based on identifying the multiple account identifiers for the second device; and
aggregate the more than one data usage identifier for the third device based on identifying the more than one data usage identifier for the third device.

14. The non-transitory computer-readable medium of claim 8, where a third data usage identifier, of the multiple data usage identifiers, is associated with a first port identifier identifying the first port,
a fourth data usage identifier, of the multiple data usage identifiers, is associated with a second port identifier identifying the second port, and
where the one or more instructions, when executed by the one or more processors, further cause the one or more processors to:
store a data structure to identify that the third data usage identifier is associated with the first account identifier and that the fourth data usage identifier is associated with the second account identifier.

15. A method, comprising:

receiving, by a first device, a device identifier and a plurality of associated data usage identifiers, the plurality of associated data usage identifiers being associated with data used to provision a plurality of services via a second device, the plurality of services including one or more of:
an in-vehicle Wi-Fi service,
a navigation service,
an infotainment service,
a vehicle control/diagnostic service, or
a remote access service, a first data usage identifier, of the plurality of associated data usage identifiers, to identify whether data was provided via a private network or a non-private network, and a second data usage identifier, of the plurality of associated data usage identifiers, being associated with one or more port identifiers that identify one or more ports of the second device, a first port, of the one or more ports, being associated with a first service of the plurality of services, a second port, of the one or more ports, being associated with a second service, and the first service being different than the second service;

identifying, by the first device, a plurality of account identifiers associated with the device identifier, the plurality of account identifiers being associated with the plurality of services, a first account identifier, of the plurality of account identifiers, that identifies a first account associated with the second device, the first account being associated with the first service, a second account identifier, of the plurality of account identifiers, that identifies a second account associated with the second device, the second account being associated with the second service, and the first account and the second account being different accounts;

associating, by the first device, the plurality of associated data usage identifiers with the plurality of account identifiers;

determining, by the first device, information indicating an amount of data used to cause the first device to transmit a message; and transmitting, by the first device, the message based on the information.

16. The method of claim 15, where determining the information comprises:

determining a first amount of data for the first account;
determining a second amount of data for the second; and
where transmitting the message comprises:
transmitting a first message based on the first amount of data; and
transmitting a second message based on the second amount of data.

17. The method of claim 15, further comprising:
determining a first value for the first account;
determining a second value for the second account; and
where transmitting the message comprises:
transmitting the message using the first value or the second value.

18. The method of claim 15, where identifying the plurality of account identifiers comprises:
identifying the first account identifier associated with first data;
identifying the second account identifier associated with second data; and
where determining the information comprises:
determining first information for the first account identifier based on identifying the first account identifier; and
determining second information for the second account identifier based on identifying the second account identifier.

19. The method of claim 15, further comprising:
mapping the first account identifier and a third data usage identifier;
mapping the second account identifier and a fourth data usage identifier,
and
where identifying the plurality of account identifiers comprises:
identifying the plurality of account identifiers based on mapping the first account identifier and the third data usage identifier or based on mapping the second account identifier and the fourth data usage identifier.

20. The method of claim 15, where transmitting the message comprises:
transmitting the message to the second device to cause the second device to disable an application or a user interface of the second device based on the information.

* * * * *